United States Patent [19]
Davidovits

[11] 3,950,470
[45] Apr. 13, 1976

[54] PROCESS FOR THE FABRICATION OF SINTERED PANELS AND PANELS RESULTING FROM THE APPLICATION OF THIS PROCESS

[75] Inventor: Joseph Davidovits, Saint-Quentin, France

[73] Assignee: Coordination et Developpement de l'Innovation Societe Anonyme, en Abrege CORDI, Saint-Quentin, France

[22] Filed: Oct. 29, 1973

[21] Appl. No.: 410,490

[30] Foreign Application Priority Data
Oct. 9, 1973 France .............................. 73.35979
Nov. 2, 1972 France .............................. 73.38746

[52] U.S. Cl. ................. 264/113; 264/112; 264/212; 264/216
[51] Int. Cl.² ........................ B29D 7/02; B29D 7/08
[58] Field of Search ........ 106/71, 73; 264/112, 113, 264/212, 216

[56] References Cited
UNITED STATES PATENTS
3,193,440  7/1965  Schafer ............................... 264/112
3,778,281  12/1973  Brown et al. .......................... 106/71

*Primary Examiner*—Donald J. Arnold
*Assistant Examiner*—John Parrish
*Attorney, Agent, or Firm*—Bacon & Thomas

[57] ABSTRACT

The invention pertains to a panel manufacturing process comprising the steps of spreading in succession on a stationary or mobile support a layer of an alkaline silicate mixture, followed by a layer of an intimate mixture of mineral or organic particles and/or fibres and of an organic bonding agent and of simultaneously compressing these layers by bringing them up to a temperature of at least 80°C depending on the bonding agent used.

6 Claims, No Drawings

PROCESS FOR THE FABRICATION OF SINTERED PANELS AND PANELS RESULTING FROM THE APPLICATION OF THIS PROCESS

By panels is meant any volume capable of being produced by pressing, the invention concerning more particularly the fabrication of sintered panels.

The object of this invention is to produce such panels in a manner whereby at least one of their surfaces is covered with a preparation, finishing product or facing.

One of the main features of the invention is the fact that the preparations, finishing products or facings are formed during the sintering operation proper, that is to say at the same time as the pressing, casting and heating operations.

It is, of course, well known that in order to manufacture, for instance, panels made of organic or mineral particles, fibres or sheets use is made of thermo-setting resins of the urea-formol, melanin-formol phenol-formol and other types as bonding agent. The materials are cast by pressure, and hardening is effected under the action of heat. The pressures utilized are of the order of 5 to 150 Kg/cm$^2$ or 10 to 150 kg/cm$^2$ and the temperatures generally range between 145°C and 250°C, the pressing and heating times varying with the nature of the resin and the thickness of the layer to be sintered. Depending on the quantity of resin utilized, more or less waterproof panels are obtained, which lend themselves more or less easily to the subsequent conventional operations of finishing by means of fillers, paints or lacquers. In the case of materials in sheets, where the quantities of thermo-setting resin are considerable, these resins form the finishing layer, and the product obtained is known as "stratified". In the case of particles or fibres, large quantities of thermo-setting resins intervene in the products known as "weatherproof" panels, that is to say intended for external use. This quantity of resin, on the other hand, prevents any finishing operation by the conventional means, paints, lacquers or pastes which adhere with difficulty to such surfaces.

By proceeding according to the invention it is possible first of all to do away with a filler operation. What are known as the stratified or weatherproof panels can then be made suitable for receiving any subsequent finishing. It is also possible generally to give directly to the volumes of bonded particles, fibres or sheets an original finishing and an appearance of quality identical with stone, brick, plaster or any other conventional facing.

For a long time products obtained by the silico-alkaline reaction of a siliceous material with a base, and more particularly of clayish materials which have reacted with alkaline leachings have been known. These products are currently utilized in the building industry in varied forms such as artificial stone, brick, hydraulic bond, facing known as non burnt ceramic, and others. The known processes of fabrication utilize the chemical reaction between a siliceous material, and more particularly a clayish material, with an alkaline leaching at relatively high temperatures, i.e., ranging between 20°C and 350°C, during a relatively long time from several hours to several days according to the temperatures selected. As a rule, the silico-alkaline mixture is shaped by pressing, the rate of compression determining the physical features and mechanical characteristics obtained. Examples of these include the hydrosodalite type products obtained from a mixture of clay and caustic soda and the silicalsite type obtained from a mixture of clay or sand with lime.

Some synthetic silicates also lend themselves easily to this silico-alkaline reaction: for example, the products called "CS" described in French patent No. 1.584.873, or the products known as "pseudowolastonite" described in French patent No. 2.071.019.

The process according to the present invention is characterized in that it consists substantially of spreading in succession on a stationary or mobile support a layer of a silico-alkaline mixture, followed by an intimate mixture of organic or mineral particles and/or fibres and of an organic bond (i.e. bonding agent) and of simultaneously compressing these layers by bringing them up to a temperature of at least 80°C in proportion to the bonding agent utilized. The stationary or mobile support may take the form of a cast.

With this process it is possible to produce agglomerated volumes covered with a filler for paint or lacquer or any facing of which the properties are superior to plaster or any aesthetic product, whether smooth or in relief, having the appearance of natural stone, brick or any other conventional facing. In addition, the products obtained are characterized by a good fire-proof quality.

In order to illustrate the process according to the invention, two examples are given below in which particles of wood are combined with a finishing based on hydrosodalite, the latter being obtained by silico-alkaline reaction between a clay, kaolin for instance, and caustic soda.

EXAMPLE I

On a stationary or mobile support is placed a layer 5 mm. thick of a mixture formed of 50 parts of kaolin and 50 parts of fine sand to which has been added 6% of caustic soda and 12% of water; on this layer is spread a layer of a mixture formed by 100 parts of sawdust and 10 parts of thermo-setting urea-formal resin on a thickness such as to have a final product of 20 mm. The products are pressed at 20 kg. per sq. cm. during 4 minutes and 30 seconds at 170°C.

In this way is obtained a wood-fibre panel covered on one face with a layer of white hydrosodalite, smooth, hard and microporous.

It is of course well known that the time needed for the hardening of the resin (polymerization) depends on the thickness of the materials. Consequently, in order to make wood-fibre panels with a thickness of below 20 mm, say equal to 10 mm., the fabrication time for these panels according to the example described above is then reduced to 3 minutes; for manufacturing 50 mm. thick panels, the pressure and heating time is then 25 minutes; similarly, the pressure utilized is in relation to the composition of the material to be sintered. It will generally range between 5 and 150 kg/cm$^2$.

EXAMPLE II

In this example, the same qualitative and quantitative characteristics have been brought into play as in the preceding example, while on the layer of the sawdust and resin mixture a second layer of the mixture of kaolin, sand, caustic soda and water has been spread.

If necessary, it is possible to make the surface of the facing harder and less porous. All that is needed for that is to add in the kaolin/sand mixture of the above example from 1 to 10% of a silicate of alkaline metals. This may be of interest above all if the panel is intended for external use, and that it is therefore necessary to protect the wooden core from bad weather effects. Another alternative of course is to mix other loads with the kaolin than sand, like particles of stone, brick, slate etc. and of mineral or organic pigments, for example.

Instead of using the clay-soda reaction, without changing the principle of the process according to the invention, simply by adapting the optimal temperature and time conditions, products may be obtained the facing of which is based on other silico-alkaline reactions, as, for instance, clay-lime, clay-carbonate, clay-calcium chloride, and in general all clays, as well as the synthetic silicates of the CS or pseudowolastonite type which react with alkaline lyes, such as soda, lime or sodium carbonate. The substance forming the volume of compositions may take the form of vegetable particles, fibres or sheets and originate from cellulose products like wood, for example, wood fragments, flax, straw, paper, pasteboard; organic products like wool, natural artificial or synthetic textile fibres, and of mineral products such as glass, rock wool, vermiculite, asbestos, expanded clay. In general, any mineral or organic substance can be sintered.

Various modifications can of course be made by the technician to the process which has just been described merely by way of an example which is non-limitative without departing from the framework of the invention.

What I claim is:

1. A panel manufacturing process characterized in that it consists substantially of spreading in succession on a stationary or mobile support a layer of an alkaline silicate mixture, said alkaline silicate mixture being formed by the mixture of a clay material and an alkaline lye selected from the group consisting of soda, lime and sodium carbonate; followed by a layer of a mixture of mineral particles selected from the group consisting of glass, rock wool, vermiculite, asbestos and expanded clay; or organic particles selected from the group consisting of wood fragments, sawdust, vegetable particles, flax, straw, paper, pasteboard, and organic fibers of, natural, or synthetic textile fibers; and of an organic thermosetting resin, and simultaneously compressing these layers and bring them up to a temperature of at least 80°C.

2. Process according to claim 1, characterized in that the stationary or mobile support takes the form of a cast.

3. Process according to claim 1, characterized in that the alkaline silicate mixture is formed by a mixture of clay material and sand.

4. Process according to claim 1, characterized in that to the alkaline silicate mixture are added particles of stones, bricks, or slates.

5. Process according to claim 1, wherein the thermosetting resin is urea-formal resin.

6. Process according to claim 1, characterized in that the compression pressure is of the order of 5 to 150 kg/cm$^2$.

* * * * *